July 28, 1931.  R. RUEMELIN  1,816,197

CLAMP

Filed March 17, 1930

Inventor
Richard Ruemelin
By
Attorney

Patented July 28, 1931

1,816,197

UNITED STATES PATENT OFFICE

RICHARD RUEMELIN, OF MILWAUKEE, WISCONSIN

CLAMP

Application filed March 17, 1930. Serial No. 436,319.

My invention relates to an improvement in hose clamps particularly adapted to be used for clamping the ends of the tubular cleaners in an air cleaning device. It is essential that the air cleaning tubes which are usually made of cloth or textile material so that air can pass through the same in a dust arrester, have their ends clamped on to collars that support the same tight enough to prevent air leakage and also holding the cleaning tubes from becoming disengaged from the supporting collars.

A feature of my clamp resides in a simple structure which may be easily tightened by hand, and thus may be easily attached or disengaged when it is desired to remove a cleaning tube from an air cleaning device. I have not illustrated the air cleaning device in the drawings, but have shown the collar for supporting the flexible tube in section so as to illustrate the relative position of the parts.

A further object of my clamp is to provide a structure which permits the use of a clamping wire and provides an arcuated bearing which completes the surface between the ends of the wire and the parts of the clamp and wherein the operating parts are adjustable so that the end of the wire may be drawn tightly about to clamp the tube to the collar or pipe.

My clamp may be used with a flexible wire as the clamping element or a band of flat ribbon-like metal and the bearing may be in sections so as to hinge together if it is desired. However, it is important that the parts be sturdy and adjustable so that with a wing clamping nut the clamping band either of wire or ribbon-like band can be claimed tightly over the tube to lock the same. In air cleaning machines which I manufacture I find that this clamp is the most satisfactory means of holding the air cleaning tubes in position in the air cleaner. Other clamps have been designed, but the structure of these have not been of a nature capable of holding the tube tightly in place.

These features together with other objects of my invention will be more clearly and fully set forth in the following specification and claims.

In the drawings forming a part of the specification:

Figure 1:
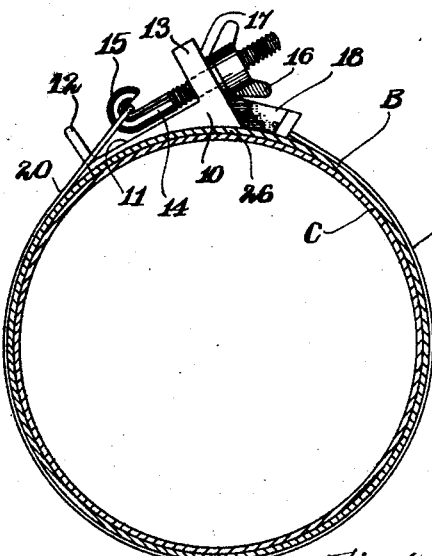
Figure 1 is a side elevation of my hose clamp.

The hose clamp A is designed for use in holding flexible hoses or tubes upon a rigid coupling or connector. A flexible clamping member is adapted to encircle the hose B, and by tightening this clamping member the hose is pressed into contact with the collar such as C, within the hose, and held in this position against slipping. The hose B may be of any suitable nature and where it is of a textile nature, such as in an air cleaner, its wall is naturally thin.

My clamp A is formed with an arcuated base plate 10 which is adapted to fit about the hose for a small portion of the circumference thereof. This base portion 10 is provided with a flat upper surface 11. At one end of this flat upper surface 11 a small lug 12 extends upwardly. The lug 12 is only a portion of the width of the base plate 10, and is centrally positioned laterally at the end of the plate 10.

At the other end of the plate member 10, and extending upwardly from the surface 11 of the same, I provide a pair of spaced lugs 13. These lugs 13 project upwardly at right angles to the flat surface 11 of the base member 10, and form a yoke for a hook bolt 14. The bolt 14 fits between the spaced lugs 13, and extends in parallel relation to the upper flat surface 11 of the base member 10, the hooked end 15 extending toward the small lug 12, and the threaded end extending between the spaced lugs 13. A thumb nut 16 permits the bolt 14 to be adjusted, moving the hook end 15 nearer to, or farther from, the spaced lugs 13 as it is turned, bearing against the bearing surface 17 of the lugs 13.

Adjacent the end of the base plate 10 from which the lugs 13 are adapted to project, I provide a projecting portion 18, the lower surface of which is arcuated in simulation with the arcuated surface 26 under the body portion 10 and follows the contour of the hose to be clamped by my clamp. This portion 18 projects somewhat beyond the end of the base plate 10, and is provided at its extreme end with a pair of short oppositely extending ears 19. These ears 19 are provided with small holes drilled through the body of the same in parallel relation with the direction of the rearwardly extending portion 18. The ends of the flexible wire clamping member 20 are inserted through these holes and clinched securely.

In clamping a hose within my clamp A, I place the base plate 10 extending a portion of the distance about the circumference of the hose. Holding the plate in this position, I draw the wire clamping member 20 about the hose, looping the end of the same into the hooked end 15 of the previously loosened hook bolt 14. By turning the thumb nut 16, the wire clamping member 20 may be drawn tightly against the hose, clamping the same in position.

In removing the clamp from place about a hose, it is only necessary to loosen the thumb nut 16 sufficiently to allow the hook bolt to be disengaged from the yoke member formed by the two lugs 13. The lug 12 prevents the looped end of the wire clamping member 20 from entirely unloosening from the clamping plate.

Figure 3:
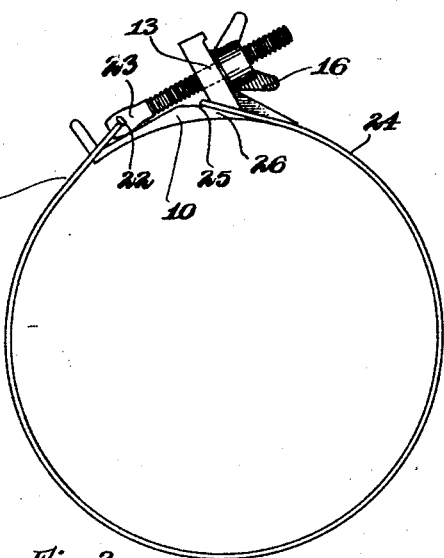
Figure 3 is a side elevation of an alternate form of hose clamp.
Figure 2:
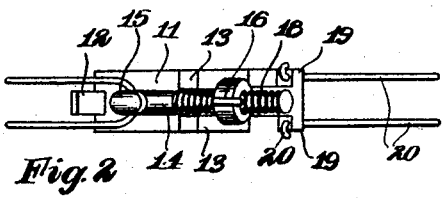
Figure 2 is a plan view of the same.
Figure 4:
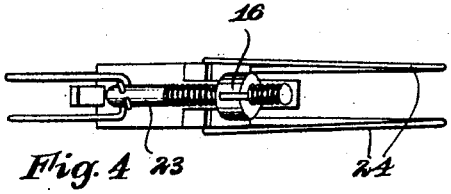
Figure 4 is a plan view of the clamp illustrated in Figure 3.

The modification of this hose clamp illustrated in Figures 3 and 4 differs slightly from the clamp shown in Figures 1 and 2, which has been hereinbefore described. In the clamp disclosed in Figures 3 and 4, the ends of the wire are inserted through a single hole 22 near the end of the tightening bolt 23. The wire clamping member 24 being attached in this manner, the hook end 15 of the bolt is made unnecessary, as are also the oppositely extending ears 19 to which the ends of the wire clamping member 20 were attached. The looped end of the clamping wire 24 is passed about the base of the lugs 13, in the recess 25, while the free ends pass through the hole 22 in the bolt 23. Then by tightening the thumb screw 16 the wire clamping member 24 is drawn tightly about the tube B in the same manner as the wire 20 is tightened about the tube B over the collar C. In this construction of the clamp A the under surface of the body 10 is arcuated at 16 to fit the contour of the tube about which the clamp is used.

In Figure 4 I have illustrated the structure wherein the body portion 10 is formed in two parts, one carrying the lugs 13 and having a pivot point 27, while the other portion 28 is pivotally connected at 27 and thus the arcuated surface of the under side of the body of the clamp A is adjustable to the surface about which it is being clamped.

Figure 5:
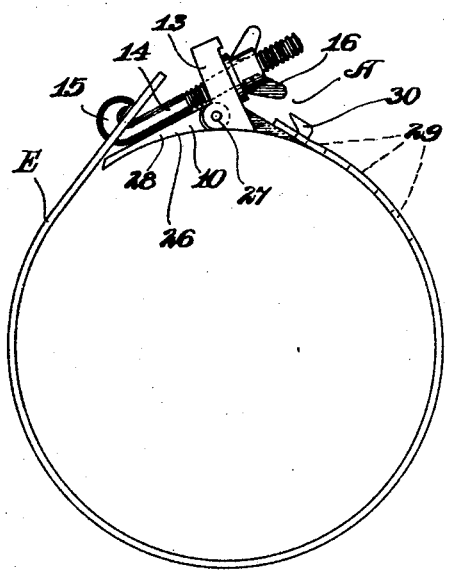
Figure 5 is a side elevation of another modification of hose clamp.

In this structure I use a ribbon-like steel band E in place of the wires 20 or 24 heretofore described, and this band is provided with a notched end which fits over the hook 15 of the bolt 14, while the other end of the band E is provided with a series of openings 29 which hook over the hook member 30 formed in the body 10 of the clamp, as illustrated in Figure 5.

Figure 6:
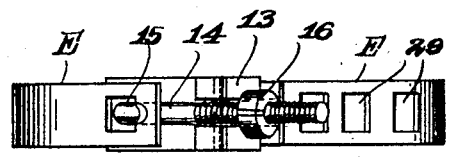
Figure 6 is a plan view of the hose clamp illustrated in Figure 5.

I have found that ordinary hose clamps will not operate to clamp the tubular textile hose which is used in air cleaning machines owing to the fact that the wall of the textile or cloth tube is thin and there is no body to clamp against, and also owing to the fact that a very true body portion such as 10 is necessary with sufficient strength to permit the clamping force to be exerted to the clamping wires 20 or 24 or the band E so as to tighten the same about the collar C. My clamp provides a sturdy base structure for holding the draw bolt such as 14, against which sufficient pressure can be exerted to pinch the flexible clamping element about the tube and provide a tight joint so that the tube will be held against disengagement and will be air-tight about the same. In the adjustable structure of Figures 5 and 6 the base structure of the clamp body for tightening the flexible member is adjustable to the desired shape and fits the contour of the surface over which it is being clamped. My clamp may be used for other purposes and is particularly designed to be readily applied or to permit the same to be disengaged and the parts are of a sturdy structure having a comparatively flat working surface against which the thumb nut 16 may operate to draw the flexible clamping element tight.

I claim:

1. A tube clamp including, a body portion having an under arcuated surface, a flat bed above said under arcuated surface, a threaded draw bolt having a hook end adapted to work on said flat surface an upwardly projecting lug on one end of said body portion and a flexible clamping member one end of which is engaged by said hook end and the other end being connected to said body to pinch the flexible clamping member tightly about a tube to support the same said upwardly projecting lug forming a guide for said flexible member.

2. A clamp for flexible air cleaner tubes including, a clamping body, an adjustable bolt member, a nut for adjusting said bolt, a flat working surface on said body for said nut for adjusting said bolt, a flexible clamping member adapted to extend about the tube, means for connecting one end of said flexible member to said bolt cooperating with a flat surface over which said bolt operates to prevent rotation of the bolt, means for connecting the other end of said flexible member to said body whereby when said nut is adjusted said flexible member will be drawn tightly about the tube.

3. A textile hose clamp for cleaners including, a clamping body, an adjustable clamping bolt, lugs between which said bolt is adapted to operate, a flat working surface on one side of said lug, a wing nut operable on said working surface, a flexible clamping band, means for connecting said flexible band on one end to said body of said clamp, a flat surface on said clamp along which said bolt operates, means for connecting the other end of said flexible band to said bolt cooperating with said surface along which said bolt operates to prevent rotation of the bolt, and an arcuated bottom clamping surface formed on said body cooperating with said flexible band to clamp the air cleaning tube to a collar.

4. A hose clamp including, a body portion having two parts hingedly connected together, an adjustable clamping bolt, a nut for operating said bolt, a working surface formed on one of said body parts for said nut to work against, a hook formed on one of said body parts, a hook formed on said bolt, and a flexible clamping band, said band operating with said body to clamp the hose about a connecting tube over which the hose extends.

5. A hose clamp including, a body portion, an arcuated clamping surface formed on the bottom of said body portion, an adjustable bolt carried on top of said body portion, lugs for receiving said bolt, a thumb nut for engaging said bolt to adjust the same, a surface on which said bolt is adapted to rest, a flexible member having one end connected to said body portion and the other to said bolt to provide an adjustable hose clamp and means on said bolt for connecting said flexible member cooperating with said surface upon which the bolt rests to prevent rotation of said bolt.

6. A hose clamp including, a body portion, an arcuated under surface formed on said body portion, an upper surface for receiving a bolt, an adjustable bolt, a nut for adjusting said bolt, an upwardly projecting lug on one end of said body portion, a wire loop adapted to engage said bolt and to fit on either side of said lug, and means for connecting the ends of said wire loop to said body portion whereby said wire loop is held with sides extending approximately parallel from said body portion and said bolt is adapted to adjust said wire loop to pinch the same with said arcuated surface of said body portion to form a circular hose clamp.

7. A hose clamp including, a body portion, an under surface formed on said body portion having a contour to fit the surface over which the clamp is adapted to be engaged, an adjustable threaded bolt, a wing nut for operating said bolt, lugs for holding said bolt in position to said body portion, a flexible clamping member co-operating with said bolt to be adjusted thereby and engaged by said body portion to provide a circular hose clamp adjustable by said bolt and a guide lug for said flexible member formed adjacent one end of said plate.

RICHARD RUEMELIN.